US012613819B2

(12) United States Patent
Becht et al.

(10) Patent No.: US 12,613,819 B2
(45) Date of Patent: Apr. 28, 2026

(54) SYSTEM STEERING FOR AN I/O SUSTAINABILITY TARGET

(71) Applicant: INTERNATIONAL BUSINESS MACHINES CORPORATION, Armonk, NY (US)

(72) Inventors: Michael James Becht, Poughkeepsie, NY (US); Pasquale A. Catalano, Wallkill, NY (US); Christopher J Colonna, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/664,401

(22) Filed: May 15, 2024

(65) Prior Publication Data

US 2025/0355820 A1     Nov. 20, 2025

(51) Int. Cl.
| | |
|---|---|
| G06F 13/20 | (2006.01) |
| G06F 1/26 | (2006.01) |
| G06F 1/28 | (2006.01) |

(52) U.S. Cl.
CPC .............. G06F 13/20 (2013.01); G06F 1/266 (2013.01); G06F 1/28 (2013.01)

(58) Field of Classification Search
CPC .............................. G06F 3/0653; G06N 3/045
See application file for complete search history.

(56) References Cited

U.S. PATENT DOCUMENTS

| | | | |
|---|---|---|---|
| 11,818,006 B2 | 11/2023 | Palmero et al. | |
| 2007/0294552 A1* | 12/2007 | Kakihara .............. | G06F 3/0653 |
| | | | 713/320 |
| 2018/0285159 A1* | 10/2018 | Shen ...................... | G06F 3/0635 |
| 2019/0279095 A1* | 9/2019 | Guntoro ................. | G06N 3/045 |
| 2023/0185456 A1* | 6/2023 | Don ....................... | G06F 3/0653 |
| | | | 711/111 |
| 2023/0345339 A1 | 10/2023 | Jung et al. | |

OTHER PUBLICATIONS

Anonymous, Optimized Usage of Image-Recognition Algorithms for Achieving Efficient Power Utilization, An IP.com Prior Art Database Technical Disclosure, IP.com No. IPCOM000268429D, IP.com Electronic Publication Date: Jan. 30, 2022, 9 pages.
Bunsen et al., An Introductory Review of Input-Output Analysis in Sustainability Sciences Including Potential Implications of Aggregation, MDPI, Sustainability 2023, 15(1), 46, https://doi.org/10.3390/su15010046, Published: Dec. 20, 2022, 24 pages.

(Continued)

*Primary Examiner* — Getente A Yimer
(74) *Attorney, Agent, or Firm* — Onyx IP Group

(57) ABSTRACT

Methods, systems, and products for system steering for an I/O sustainability target includes tracking, for each adapter of a plurality of adapters included in a system, a power consumption associated with the adapter and an amount of data transferred by the adapter, calculating, based on the tracking, a power to data ratio associated with the plurality of adapters, and routing one or more I/O commands to a lowest power adapter of the plurality of adapters based on comparing the power to data ratio with a power target.

20 Claims, 4 Drawing Sheets

(56) References Cited

OTHER PUBLICATIONS

Isaac Okola, The Contribution of Input-Output Multi-Objective Optimization Model of Sustainable Consumption and Production in Food-Energy-Water Nexus, KCA University, https://www.uvu.edu/global/docs/wim22/sdg2/sdg2-okola.pdf, printed Feb. 14, 2024, 10 pages.

Juergen Carstens, Power Consumption Optimization and a Framework for Adaptive Symbol Rate Transmission with Two Layers Feedback Scheme Incorporated into the Network Management, An IP.com Prior Art Database Technical Disclosure, IP.com No. IPCOM000173713D, Nokia Siemens Networks 2008, Original Publication Date: Sep. 11, 2008, IP.com Electronic Publication Date: Sep. 11, 2008, 6 pages.

Seagate Technology, LLC, Staged NVMe in a Primary/Secondary Relationship, An IP.com Prior Art Database Technical Disclosure, IP.com No. IPCOM000268073D, Seagate Technology LLC, IP.com Electronic Publication Date: Dec. 21, 2021, 4 pages.

Wu et al., Input-output efficiency model of urban green-energy development from the perspective of a low-carbon economy, Clean Energy, vol. 6, Issue 3, Feb. 2022, https://doi.org/10.1093/ce/zkac030, Published: Jan. 11, 2022, Downloaded Jan. 13, 2022, 12 pages.

* cited by examiner

Paths 110

200

SYSTEM STEERING FOR AN I/O SUSTAINABILITY TARGET

BACKGROUND

Field of the Disclosure

The field of the disclosure is data processing, or, more specifically, methods, systems, and products for system steering for an I/O sustainability target.

Description of Related Art

Computing systems often include multiple adapters for routing I/O commands to coupled I/O devices or storage devices. Often, a computing system will include multiple adapters coupled to the same destination. Different adapters in a computing system may consume different amounts of power and may transfer different amounts of data (based on which adapter is selected for routing I/O commands to the destination).

SUMMARY

Methods and systems for system steering for an I/O sustainability target according to various embodiments are disclosed in this specification. In accordance with one aspect of the present disclosure, a method of system steering for an I/O sustainability target may include tracking, for each adapter of a plurality of adapters included in a system, a power consumption associated with the adapter and an amount of data transferred by the adapter, calculating, based on the tracking, a power to data ratio associated with the plurality of adapters, and routing one or more I/O commands to a lowest power adapter of the plurality of adapters based on comparing the power to data ratio with a power target.

In accordance with another aspect of the present disclosure, dynamically routing I/O commands may include a computing system including: a processor, a plurality of adapters, memory, and an I/O controller for controlling I/O operations from the computing system, the I/O controller configured to: track, for each adapter of the plurality of adapters, a power consumption associated with the adapter and an amount of data transferred by the adapter, calculate, based on the tracking, a power to data ratio associated with the plurality of adapters, and route one or more I/O commands to a lowest power adapter of the plurality of adapters based on comparing the power to data ratio with a power target.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
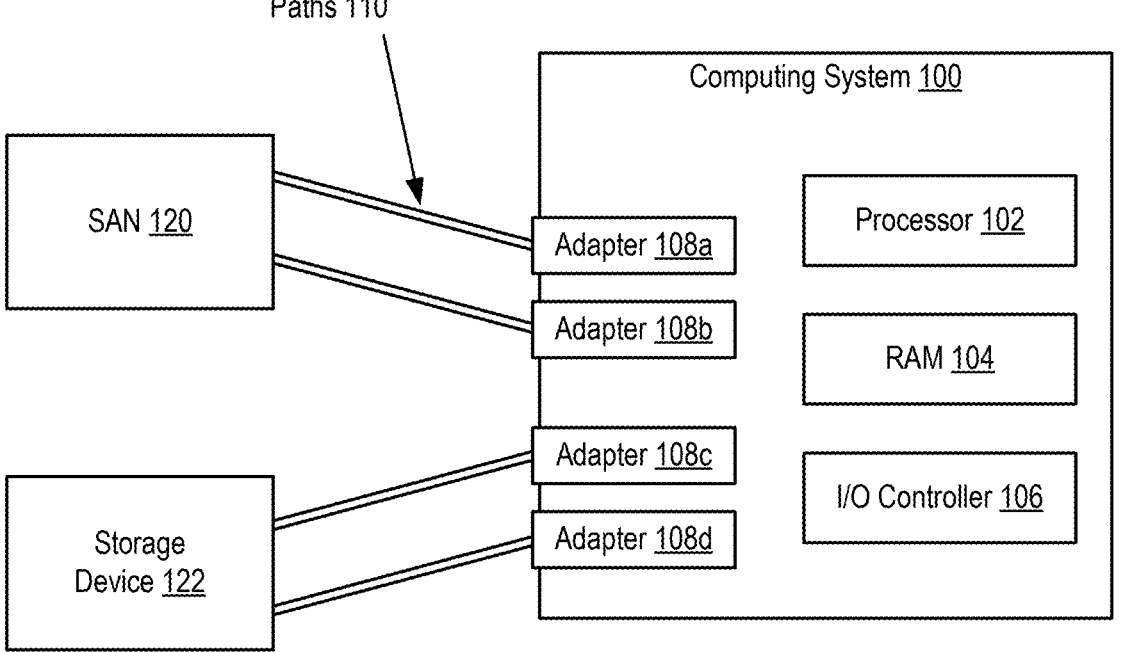
FIG. 1 shows an example line drawing of a system configured for system steering for an I/O sustainability target in accordance with embodiments of the present disclosure.

In accordance with one aspect of the present disclosure, a method of system steering for an I/O sustainability target may include tracking, for each adapter of a plurality of adapters included in a system, a power consumption associated with the adapter and an amount of data transferred by the adapter, calculating, based on the tracking, a power to data ratio associated with the plurality of adapters, and routing one or more I/O commands to a lowest power adapter of the plurality of adapters based on comparing the power to data ratio with a power target. Such an embodiment allows for increased system performance and efficiency by maintaining sustainability power targets for adapters, and steering the system to meet such targets.

In another embodiment, tracking the power consumption associated with the adapter and an amount of data transferred by the adapter further comprises maintaining, for each of the adapters, a calculated running average for each of the power consumption associated with the adapter and the amount of data transferred by the adapter. Such an embodiment allows for increased system efficiency by taking into account not just the most recent data points for each adapter, but a running average taken over a period of time.

In another embodiment, the running average is calculated for data tracked over a period of time selectable by a user. Such an embodiment allows for user customization when tracking data for adapters.

In another embodiment, the power to data ratio is a calculated running average of a total power consumption of all the adapters divided by a total amount of data transferred by all the adapters for a given period of time. Such an embodiment allows for increased system efficiency by taking into account not just the most recent data points, but a running average taken over a period of time.

In another embodiment, the power target is a user selectable power to data ratio target. Such an embodiment provides additional user customization and control over the sustainability power targets.

In another embodiment, the power target is a system-wide power target. Such an embodiment provides a method of using one power target for the entire system, maintaining system-wide sustainability.

In another embodiment, the power target is one of multiple power targets, and wherein each of the power targets is associated with a different adapter group of the system. Such an embodiment provides a method of using a separate power target for each adapter group, maintaining customized sustainability.

In another embodiment, the one or more I/O commands are selected for the routing based on a data size of each of the one or more I/O commands exceeding a data size threshold limit. Such an embodiment allows for the routing of only I/O commands greater than a threshold size to more efficiently meet a power to data ratio target.

In another embodiment, the data size threshold limit is set in response to determining that the power to data ratio does not meet the power target. Such an embodiment allows for a threshold size for routing I/O commands to be set, thereby creating a method of controlling which I/O commands are selected for routing.

In another embodiment, the method further includes, if the data size threshold limit already exists upon determining that the power to data ratio does not meet the power target, adjusting the data size threshold limit to route more I/O commands. Such an embodiment provides a method for steering the system to meet the power target.

In another embodiment, the method further includes, if the data size threshold limit already exists upon determining that the power to data ratio meets the power target by a threshold amount, adjusting the data size threshold limit to route fewer I/O commands. Such an embodiment provides a method for steering the system to stay close to the power target.

In another embodiment, the data size of an I/O command is indicated by a control block included in the I/O command. Such an embodiment provides a method for determining the data size of each I/O command, used during the selection of I/O commands for routing.

In accordance with another aspect of the present disclosure, system steering for an I/O sustainability target may include a computing system including: a processor, a plurality of adapters, memory, and an I/O controller for controlling I/O operations from the computing system, the I/O controller configured to: track, for each adapter of the plurality of adapters, a power consumption associated with the adapter and an amount of data transferred by the adapter, calculate, based on the tracking, a power to data ratio associated with the plurality of adapters, and route one or more I/O commands to a lowest power adapter of the plurality of adapters based on comparing the power to data ratio with a power target. Such an embodiment allows for increased system performance and efficiency by maintaining sustainability power targets for adapters, and steering the system to meet such targets.

In accordance with another aspect of the present disclosure, system steering for an I/O sustainability target may include a computer program product including a computer readable storage medium and computer program instructions stored therein that, when executed, are configured to: track, for each adapter of the plurality of adapters, a power consumption associated with the adapter and an amount of data transferred by the adapter, calculate, based on the tracking, a power to data ratio associated with the plurality of adapters, and route one or more I/O commands to a lowest power adapter of the plurality of adapters based on comparing the power to data ratio with a power target. Such an embodiment allows for increased system performance and efficiency by maintaining sustainability power targets for adapters, and steering the system to meet such targets.

In accordance with another aspect of the present disclosure, system steering for an I/O sustainability target may include a combination of any of the above-described embodiments. In one example embodiment, the one or more I/O commands are selected for the routing based on a data size of each of the one or more I/O commands exceeding a data size threshold limit, the data size threshold limit is set in response to determining that the power to data ratio does not meet the power target, and the method further includes adjusting the data size threshold limit to route more I/O commands if the data size threshold limit already exists upon determining that the power to data ratio does not meet the power target. Such an embodiment allows for the routing of only I/O commands greater than a threshold size to more efficiently meet a power to data ratio target, setting the threshold limit upon first determining the target is not met, and then adjusting the threshold limit until the target is met.

Exemplary methods, systems, and products for system steering for an I/O sustainability target in accordance with the present disclosure are described with reference to the accompanying drawings, beginning with FIG. 1. FIG. 1 sets forth an example line drawing of a computing system configured for system steering for an I/O sustainability target in accordance with embodiments of the present disclosure. The example of FIG. 1 includes a computing system 100 coupled to a storage area network (SAN) 120 and a storage device 122.

The example computing system 100 of FIG. 1 includes a processor 102, random access memory (RAM) 104, and an input/output (I/O) controller 106 (or I/O processor). The example I/O controller 106 of FIG. 1 is configured to receive and process I/O commands or requests, such as handling traffic between the computing system and a storage location (such as storage device 122, SAN 120, or any other type of storage location coupled to the system and configured to store data). For example, an I/O command targeting the SAN 120 is received by the I/O controller, which then processes the command using a communication pathway (or path) between the computing system and the SAN.

In the example of FIG. 1, there are multiple communication pathways, or paths 110, coupling the computing system to each of the SAN 120 and the storage device 122. In the example of FIG. 1, the SAN 120 is coupled to the computing system 100 via a path between the SAN and adapter 108a and also via a path between the SAN and adapter 108b. Similarly, the example of FIG. 1 also includes two paths 110 coupling the storage device 122 to the computing system 100, with one path coupling the storage device 122 to adapter 108c and another path coupling the storage device 122 to adapter 108d. Each adapter (such as adapters 108a-108d in FIG. 1) are included within a port and are configured to send data from the computing system to a storage location. Some ports may utilize different types of adapters than others, and one or more of the adapters may consume different amounts of power when transferring data.

The computing system 100 may include any number of adapters coupling the computing system to a storage location (such as the SAN or storage device), and the adapters (or paths) are grouped by which destination the group of adapters (or paths) are coupled to. In the example embodiment of FIG. 1, the computing system includes two adapter groups, with a first adapter group coupled to SAN 120 and including adapters 108a and 108b, and a second adapter group coupled to storage device 122 and including adapters 108c and 108d. In another embodiment, the computing system may include four adapter groups (each coupled to one of four different storage locations), with each adapter group including eight adapters and eight associated paths.

The example I/O controller 106 of FIG. 1 may be implemented in firmware of the computing system or may be a separate I/O processor in the computing system. The I/O controller 106 of FIG. 1 is configured to track power consumption associated with each adapter and an amount of data transferred by each adapter. In one embodiment, the I/O controller 106 is configured to maintain, for each adapter, a running average for each of the power consumption associated with the adapter and the amount of data transferred by the adapter. The maintained running averages may be calculated by the I/O controller 106 by averaging the tracked data over a period of time and updating the running average periodically (where the period is user selectable or automatically determined by the I/O controller or some other processor).

The I/O controller 106 of FIG. 1 is also configured to calculate a power to data ratio associated with the adapters. The power to data ratio measures the ratio of total power consumption of the adapters to the total amount of data transferred by the adapters. In one embodiment, the power to data ratio is calculated by the I/O controller as running average by dividing the total power consumption of the adapters by the total amount of data transferred by the adapters for a given period of time (where the period is user selectable or automatically determined by the processor). In one embodiment, the I/O controller calculates a single power to data ratio for the entire computing system, taking into account the tracked data for all the adapters included in the computing system (such as adapters 108*a*-108*d*). In another embodiment, the I/O controller is configured to calculate a separate power to data ratio for each adapter group included in the system, where each power to data ratio is calculated based on tracked data for each adapter included in that adapter group. For example, the I/O controller of FIG. 1, in such an embodiment, is configured to calculate a first power to data ratio for the adapter group coupled to SAN 120 (including adapters 108*a* and 108*b*), and is further configured to calculate a second power to data ratio for the adapter group coupled to storage device 122 (including adapters 108*c* and 108*d*).

The I/O controller 106 of FIG. 1 is also configured to steer the computing system 100 according to a sustainability target. In some embodiments, the sustainability target is a power target (measuring power per byte transferred) for the adapters of the system. In one embodiment, the power target is associated with the entire computing system, as a total power per byte transferred target for all the adapters included in the computing system (such as adapters 108*a*-108*d*). In another embodiment, the computing system may assign different power targets to different adapter groups, where each power target is a total power per byte transferred target for all the adapters included in a given adapter group. In another embodiment, the computing system may assign different power targets to each operating system operating within the computing system. For example, the computing system may be configured to run multiple operating systems, where different groups of adapters are assigned to different logical partitions (each running a separate operating system). In such an example, the computer is configured to assign different power targets to each adapter group associated with each logical partition.

In one embodiment, the power target is a user defined parameter. For example, a system administrator is configured to define and set a power target (or multiple power targets, as explained above) for the system. In another embodiment, the power target is set by a data center monitoring application. For example, such a data center application may consider multiple systems and set targets for each computing system to meet a larger target. In one embodiment, the power target is adjustable. For example, a system administrator is configured to update the power target (or one or more of the power targets) of the system. In one embodiment, the power target remains fixed. In another embodiment, the power target may change based on the time (such as the time of day or week). For example, the power target may be set higher (allowing for more power per data transferred) during peak operating hours, while the power target may be lowered outside of peak hours to provide power savings for the computing system. Such power target values may be determined automatically by the computing system or may be manually set by a user (such as a system administrator).

The I/O controller 106 of FIG. 1 is also configured to compare the calculated power ratio (or power ratios) with the power target (or power targets) to determine whether the power to data ratio meets the power target. For example, a power to data ratio that has a higher value (of measured power consumption per data transferred) than the power target does not meet the power target. Similarly, a power to data ratio that meets the power target has a power to data ratio value that is lower than the power target.

The I/O controller 106 of FIG. 1 is configured to route one or more I/O commands to lower-powered adapters if the power to data ratio does not meet the power target. By routing I/O commands to adapters that consume less power, the I/O controller may lower the value of the power to data ratio to meet the power target. In one embodiment, the I/O controller only selects I/O commands (for routing to lower-powered adapters) that have a data size that exceeds a data size threshold limit. Each I/O command includes a control block that indicates the data size of the I/O command (i.e. how much data will be transferred by executing the I/O command). By comparing the data size in the control block of each I/O command with the data size threshold limit, the I/O controller selects which I/O commands will be routed to lower-powered adapters.

The data size threshold limit is set in response to determining that the power to data ratio does not meet the power target. In one embodiment, the I/O controller sets a single data size threshold limit for the computing system and all of its included adapter groups. In other embodiments, the I/O controller is configured to set multiple different data size threshold limits (such as a different data size threshold limit for each adapter group). For example, an adapter group executing low-priority I/O commands may have a set data size threshold limit that is lower (and thus allows for more I/O commands to be routed) than another higher-priority adapter group, so as not to limit performance of the computing system.

In one embodiment, if the data size threshold limit is already set and the power to data ratio does not meet the power target, the I/O controller is configured to adjust the data size threshold limit to route more I/O commands. For example, upon determining that the power to data ratio does not meet the power target and that a data size threshold limit already exists, the I/O controller is configured to lower the value of the data size threshold limit so that more I/O commands exceed the threshold and are thereby routed to lower-powered adapters. Routing more I/O commands to lower-powered adapters will further decrease the power to data ratio. By adjusting the data size threshold limit to control how many of the I/O commands are routed to lower-powered adapters, the I/O controller is configured to steer the computing system to meet the power target.

In some embodiments, the I/O controller is configured to adjust a data size threshold limit even when the power to data ratio meets the power target. Specifically, if the I/O controller determines that the power to data ratio not only meets the power target (where the power to data ratio value is lower than the power target value) but is lower than the target value by a threshold amount, the I/O controller is configured to adjust the data size threshold limit (such as by raising the value of the data size threshold limit) to route less I/O commands. Even though the I/O controller is configured to steer the computing system to meet the power target, the performance of the computing system remains a priority.

Accordingly, if the data size threshold limit is set at a value that causes the power to data ratio to be much lower than the power target, then the I/O controller may adjust the data size threshold limit to increase the power to data ratio to be closer to the power target, thereby increasing system performance while still meeting the sustainability target. The buffer between the power to data ratio and the power target allowed is user selectable or may be automatically determined by the I/O controller. By controlling how close the power to data ratio (or ratios) of the adapter groups are to their respective power targets, the I/O controller is configured to optimize system performance while meeting the sustainability targets.

In one embodiment, routing one or more I/O commands to lower-powered adapters may include routing the one or more I/O commands to the adapter that consumes the least amount of power (in that adapter group). The I/O controller is configured to determine the lowest-powered adapter based on the tracked data (such as the power consumption running average calculated for each adapter). In some examples, routing many I/O commands to the lowest-powered adapter (of that adapter group) may cause performance or latency issues, where the adapter gets backed up with too many I/O commands. However, the I/O controller is configured to take into account SLA agreements and included timing requirements when routing I/O commands and may only route I/O commands to the lowest powered adapter (based on the data size threshold limit) if doing so does not violate an SLA agreement.

In another embodiment, the I/O controller is configured to reduce the likelihood of reduced latency by routing the one or more I/O commands to two or more of the lowest-powered adapters. By selecting more than one lower-powered adapter for routing I/O commands to decrease the power to data ratio, the I/O controller allows for the routing of more I/O commands without overloading a single adapter. The number of lower-powered adapters selected for routing may be based on the number of adapters in the adapter group. For example, an adapter group with eight adapters may have two or more of the lowest-powered adapters selected for routing I/O commands based on the data size threshold limit, while an adapter with only two adapters would select only the lowest-powered adapter for such routing. In another embodiment, the number of lower-powered adapters selected for routing (based on the data size threshold limit) may be based on the value of the data size threshold limit. For example, when the data size threshold limit falls below a threshold value (or when the number or percentage of I/O commands selected for routing exceeds a threshold amount), the I/O controller may select and additional lowest-powered adapter for routing, so as to not back up any single adapter.

Figure 2:
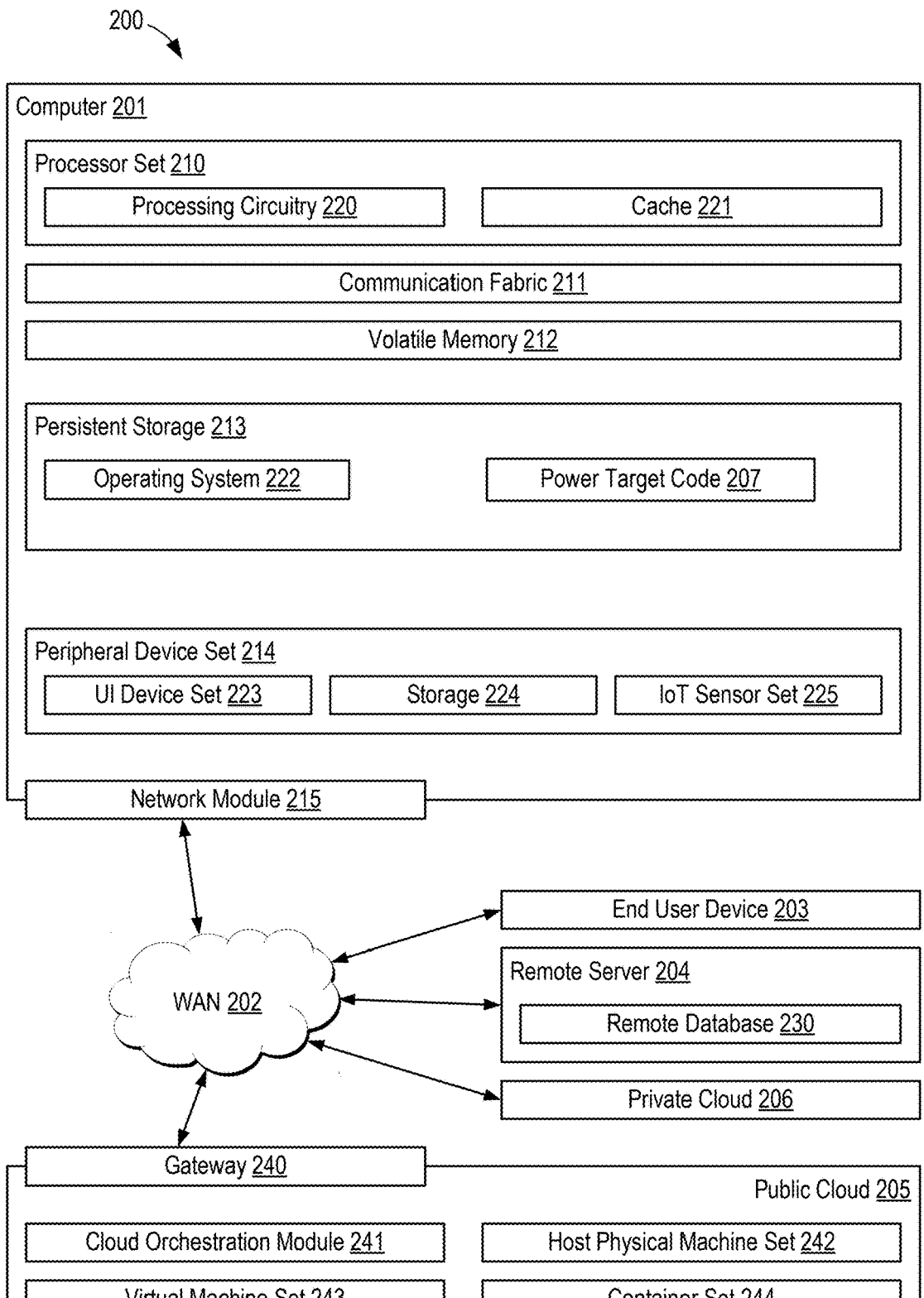
FIG. 2 is a block diagram of an example computing environment configured for system steering for an I/O sustainability target according to some embodiments of the present disclosure.

For further explanation, FIG. 2 sets forth a block diagram of computing environment 200 configured for system steering for an I/O sustainability target in accordance with embodiments of the present disclosure. Computing environment 200 contains an example of an environment for the execution of at least some of the computer code involved in performing the inventive methods, such as power target code 207. In addition to power target code 207, computing environment 200 includes, for example, computer 201, wide area network (WAN) 202, end user device (EUD) 203, remote server 204, public cloud 205, and private cloud 206. In this example embodiment, computer 201 is the computing system 100 of FIG. 1, and includes processor set 210 (including processing circuitry 220 and cache 221), communication fabric 211, volatile memory 212, persistent storage 213 (including operating system 222 and power target code 207, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in power target code 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in power target code 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices, such as sensors 225, for receiving sensor measurements.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
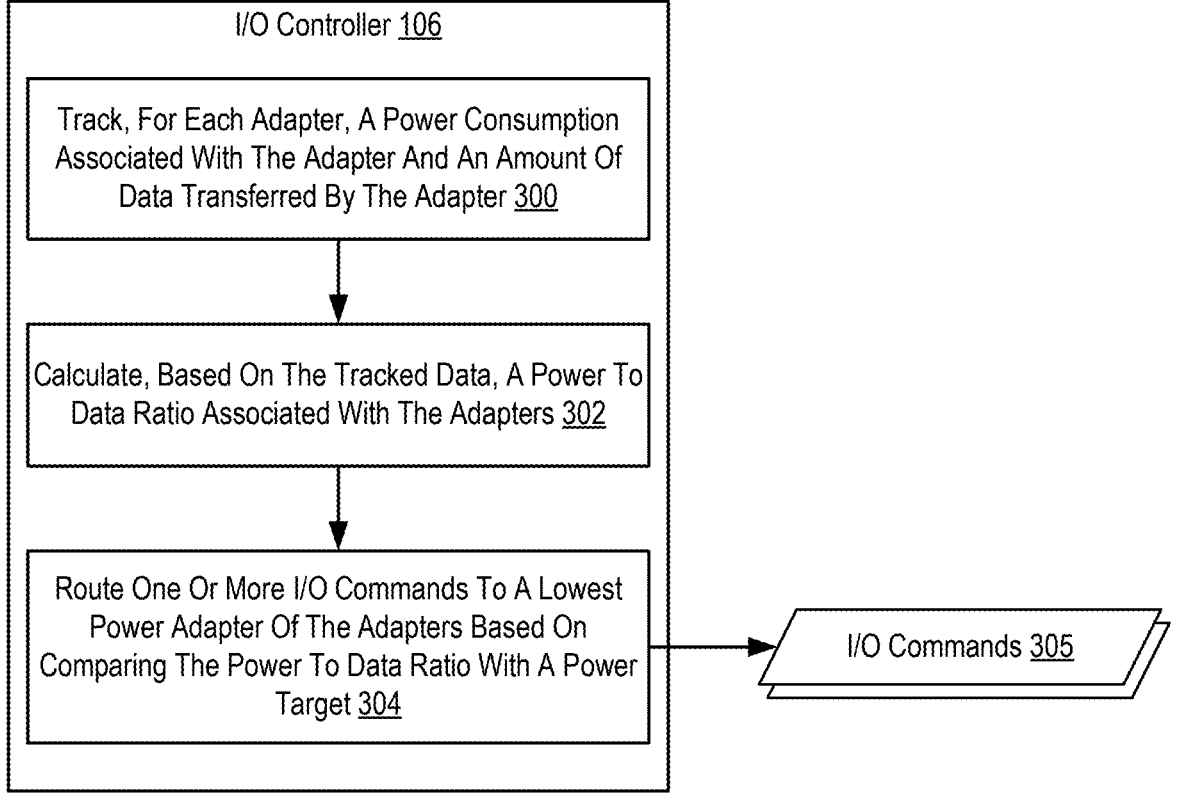
FIG. 3 is a flowchart of an example method for system steering for an I/O sustainability target according to some embodiments of the present disclosure.

For further explanation, FIG. 3 sets forth a flow chart illustrating an exemplary method of system steering for an I/O sustainability target according to embodiments of the present disclosure. The method of FIG. 3 includes tracking 300, for each adapter, a power consumption associated with the adapter and an amount of data transferred by the adapter. Tracking 300 a power consumption associated with each adapter may be carried out by the I/O controller 106 of FIG. 1 by measuring the amount of power consumed by each adapter for a given period of time. Tracking 300 an amount of data transferred by each adapter may be carried out by the I/O controller 106 of FIG. 1 by adding the data size of each I/O command executed at each adapter and calculating the total amount of data transferred by each adapter for a given period of time.

The method of FIG. 3 also includes calculating 302, based on the tracked data, a power to data ratio associated with the adapters. Calculating 302 a power to data ratio associated with the adapters may be carried out by the I/O controller 106 of FIG. 1 based on the tracked power consumption of each adapter and based on the tracked amount of data transferred by each adapter. The power to data ratio measures the ratio of total power consumption of the adapters to the total amount of data transferred by the adapters.

The method of FIG. 3 also includes routing 304 one or more I/O commands to a lowest power adapter of the adapters based on comparing the power to data ratio with a power target. Routing 304 one or more I/O commands 305 may be carried out by the I/O controller 106 of FIG. 1 in response to determining that the power to data ratio does not meet a power target. Routing the one or more I/O commands includes selecting which I/O commands to route based on the data size of the I/O command. The adapter selected for routing such I/O commands is the adapter which consumes the lowest amount of power in the adapter group (based on the tracked power consumption). For systems with multiple adapter groups, the I/O controller is configured to determine the lowest-powered adapter for each adapter group and route one or more I/O commands in each adapter group to the respective lowest-powered adapter.

Figure 4:
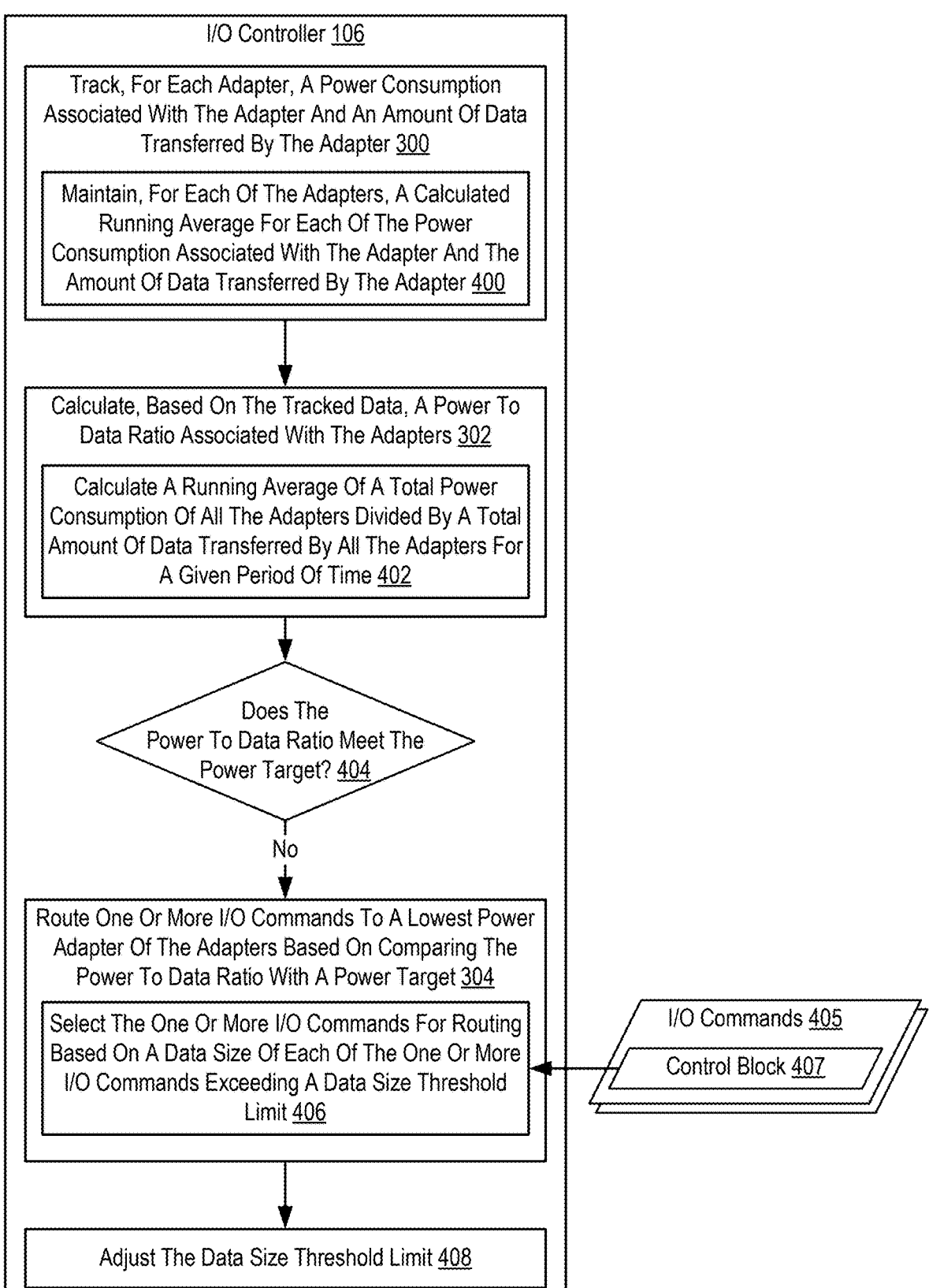
FIG. 4 is a flowchart of another example method for system steering for an I/O sustainability target according to some embodiments of the present disclosure.

For further explanation, FIG. 4 sets forth a flow chart illustrating another exemplary method of system steering for an I/O sustainability target according to embodiments of the present disclosure. The method of FIG. 4 differs from the method of FIG. 3 in that the method of FIG. 4 also includes, as part of tracking 300, maintaining 400, for each of the adapters, a calculated running average for each of the power consumption associated with the adapter and the amount of data transferred by the adapter. Maintaining 400 such calculated running averages may be carried out by the I/O controller 106 of FIG. 1 by averaging the tracked data over a period of time and updating the running average periodically (where the period is user selectable or automatically determined by the I/O controller or some other processor).

The method of FIG. 4 also includes, as part of calculating 302 a power to data ratio, calculating 402 a running average of a total power consumption of all the adapters divided by a total amount of data transferred by all the adapters for a given period of time. The power to data ratio measures the ratio of total power consumption of the adapters to the total amount of data transferred by the adapters. Calculating 402 such a running average may be carried out by the I/O controller by dividing the total power consumption of the adapters by the total amount of data transferred by the adapters for a given period of time (where the period is user selectable or automatically determined by the processor). In one embodiment, the I/O controller calculates a single power to data ratio for the entire computing system, taking into account the tracked data for all the adapters included in the computing system. In another embodiment, the I/O controller is configured to calculate a separate power to data ratio for each adapter group included in the system, where each power to data ratio is calculated based on tracked data for each adapter included in that adapter group.

The method of FIG. 4 also includes determining 404 whether the power to data ratio meets the power target. Determining 404 whether the power to data ratio meets the power target may be carried out by the I/O controller 106 of FIG. 1 by comparing the power to data ratio with the power target. For example, a power to data ratio that has a higher value (of measured power consumption per data transferred) than the power target does not meet the power target. Similarly, a power to data ratio that has a lower value (of measured power consumption per data transferred) than the power target does meet the power target.

The method of FIG. 4 also includes, as part of routing 304 one or more I/O commands, selecting 406 the one or more I/O commands for routing based on a data size of each of the one or more I/O commands exceeding a data size threshold limit. Selecting 406 the one or more I/O commands 405 for routing may be carried out by comparing, for each I/O command, a data size indicated by a control block 407 included in each I/O command with a data size threshold limit. By routing I/O commands to adapters that consume less power, the I/O controller may lower the value of the power to data ratio to meet the power target. Each I/O command 405 includes a control block 407 that indicates the data size of the I/O command (i.e. how much data will be transferred by executing the I/O command). By comparing the data size in the control block 407 of each I/O command with the data size threshold limit, the I/O controller is configured to select which I/O commands will be routed to lower-powered adapters.

The method of FIG. 4 also includes adjusting 408 the data size threshold limit. Adjusting 408 the data size threshold limit may be carried out by the I/O controller 106 of FIG. 1 responsive to determining that the power to data ratio does not meet the power target or meets the power target by an amount that exceeds a threshold. In one embodiment, if the data size threshold limit is already set and the power to data ratio does not meet the power target, the I/O controller is configured to adjust the data size threshold limit to route more I/O commands. For example, upon determining that the power to data ratio does not meet the power target and that a data size threshold limit already exists, the I/O controller is configured to lower the value of the data size threshold limit so that more I/O commands exceed the threshold and are thereby routed to lower-powered adapters. Routing more I/O commands to lower-powered adapters will further decrease the power to data ratio. By adjusting the data size threshold limit to control how many of the I/O commands are routed to lower-powered adapters, the I/O controller is configured to steer the computing system to meet the power target.

In another embodiment, the I/O controller is configured to adjust 408 a data size threshold limit even when the power to data ratio meets the power target. Specifically, if the I/O controller determines that the power to data ratio not only meets the power target (where the power to data ratio value is lower than the power target value) but is lower than the target value by a threshold amount, the I/O controller is configured to adjust the data size threshold limit (such as by raising the value of the data size threshold limit) to route less I/O commands. Even though the I/O controller is configured to steer the computing system to meet the power target, the performance of the computing system remains a priority. Accordingly, if the data size threshold limit is set at a value that causes the power to data ratio to be much lower than the power target, then the I/O controller may adjust the data size threshold limit to increase the power to data ratio to be closer to the power target, thereby increasing system performance while still meeting the sustainability target. The buffer between the power to data ratio and the power target allowed is user selectable or may be automatically determined by the I/O controller. By controlling how close the power to data ratio (or ratios) of the adapter groups are to their respective power targets, the I/O controller is configured to optimize system performance while meeting the sustainability targets.

In view of the explanations set forth above, readers will recognize that the benefits of system steering for an I/O sustainability target according to embodiments of the present disclosure include:

Increasing system efficiency by maintaining sustainability power targets for adapters, and steering the system to meet such a target (or targets).

Increasing system performance while meeting power targets by controlling how closely adapter groups meet their respective power target.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:

tracking, for each adapter of a plurality of adapters included in a system, a power consumption associated with the adapter and an amount of data transferred by the adapter;

calculating, based on the tracking, a power to data ratio associated with the plurality of adapters wherein the power to data ratio is calculated based on dividing a power consumption of the plurality of adapters by an amount of data transferred by the plurality of adapters over a period of time; and routing one or more input/output (I/O) commands to an adapter of the plurality of adapters which consumes a least amount of power based on comparing the power to data ratio with a power target, wherein a value of a data size threshold limit, associated with the one or more I/O commands, is adjusted to increase or decrease a quantity of the one or more I/O commands routed to the adapter based on whether the power to data ratio meets the power target.

2. The method of claim 1, wherein tracking the power consumption associated with the adapter and an amount of data transferred by the adapter further comprises maintaining, for each of the plurality of adapters, a calculated running average for each of the power consumption associated with the adapter and the amount of data transferred by the adapter.

3. The method of claim 2, wherein the running average is calculated for data tracked over the period of time, and wherein the period of time is selectable by a user.

4. The method of claim 1, wherein the power to data ratio is a calculated running average of a total power consumption of all the plurality of adapters divided by a total amount of data transferred by all the plurality of adapters for a given period of time.

5. The method of claim 1, wherein the power target is a user selectable power to data ratio target.

6. The method of claim 1, wherein the power target is a system-wide power target.

7. The method of claim 1, wherein the power target is one of a plurality of power targets, and wherein each of the plurality of power targets is associated with a different adapter group of the plurality of adapters.

8. The method of claim 1, wherein the one or more I/O commands are selected for the routing based on a data size of each of the one or more I/O commands exceeding the data size threshold limit.

9. The method of claim 8, wherein the data size threshold limit is set in response to determining that the power to data ratio does not meet the power target.

10. The method of claim 9, further comprising, if the data size threshold limit already exists upon determining that the power to data ratio does not meet the power target, adjusting the data size threshold limit to route more I/O commands.

11. The method of claim 8, further comprising, if the data size threshold limit already exists upon determining that the power to data ratio meets the power target by a threshold amount, adjusting the data size threshold limit to route fewer I/O commands.

12. The method of claim 8, wherein the data size of an I/O command is indicated by a control block included in the I/O command.

13. A computing system comprising:
a processor;
a plurality of adapters;
memory; and
an input/output (I/O) controller for controlling I/O operations from the computing system, the I/O controller configured to:
track, for each adapter of the plurality of adapters, a power consumption associated with the adapter and an amount of data transferred by the adapter;
calculate, based on the tracking, a power to data ratio associated with the plurality of adapters,
wherein the power to data ratio is calculated based on dividing a power consumption of the plurality of adapters by an amount of data transferred by the plurality of adapters over a period of time; and route one or more I/O commands to an adapter of the plurality of adapters which consumes a least amount of power based on comparing the power to data ratio with a power target, wherein a value of a data size threshold limit, associated with the one or more I/O commands, is adjusted to increase or decrease a quantity of the one or more I/O commands routed to the adapter based on whether the power to data ratio meets the power target.

14. The computing system of claim 13, wherein, when tracking the power consumption associated with the adapter and an amount of data transferred by the adapter, the I/O controller is further configured to maintain, for each of the plurality of adapters, a calculated running average for each of the power consumption associated with the adapter and the amount of data transferred by the adapter.

15. The computing system of claim 13, wherein the power to data ratio is a calculated running average of a total power consumption of all the plurality of adapters divided by a total amount of data transferred by all the plurality of adapters for a given period of time.

16. The computing system of claim 13, wherein the one or more I/O commands are selected for routing the one or more I/O commands based on a data size of each of the one or more I/O commands exceeding the data size threshold limit.

17. The computing system of claim 16, wherein the data size threshold limit is set in response to determining that the power to data ratio does not meet the power target.

18. The computing system of claim 17, wherein the I/O controller is further configured to, if the data size threshold limit already exists upon determining that the power to data ratio does not meet the power target, adjust the data size threshold limit to route more I/O commands.

19. The computing system of claim 16, wherein the I/O controller is further configured to, if the data size threshold limit already exists upon determining that the power to data ratio meets the power target by a threshold amount, adjust the data size threshold limit to route fewer I/O commands.

20. A computer program product comprising a non-transitory computer readable storage medium and computer program instructions stored in the non-transitory computer readable storage medium that, when executed, are configured to:
track, for each adapter of a plurality of adapters included in a system, a power consumption associated with the adapter and an amount of data transferred by the adapter;
calculate, based on the tracking, a power to data ratio associated with the plurality of adapters,
wherein the power to data ratio is calculated based on dividing a power consumption of the plurality of adapters by an amount of data transferred by the plurality of adapters over a period of time; and
route one or more the one or more I/O commands commands to an adapter of the plurality of adapters which consumes a least amount of power based on comparing the power to data ratio with a power target,
wherein a value of a data size threshold limit, associated with the one or more I/O commands, is adjusted to increase or decrease a quantity of the one or more I/O commands routed to the adapter based on whether the power to data ratio meets the power target.

* * * * *